No. 786,286. PATENTED APR. 4, 1905.
E. HAACK.
CORN PICKER AND HUSKER.
APPLICATION FILED APR. 18, 1904.

3 SHEETS—SHEET 1.

Witnesses.
Edward T. Wray.
Fred G. Fischer

Inventor.
Emil Haack
by Burton & Burton
his Attys.

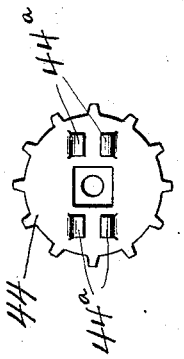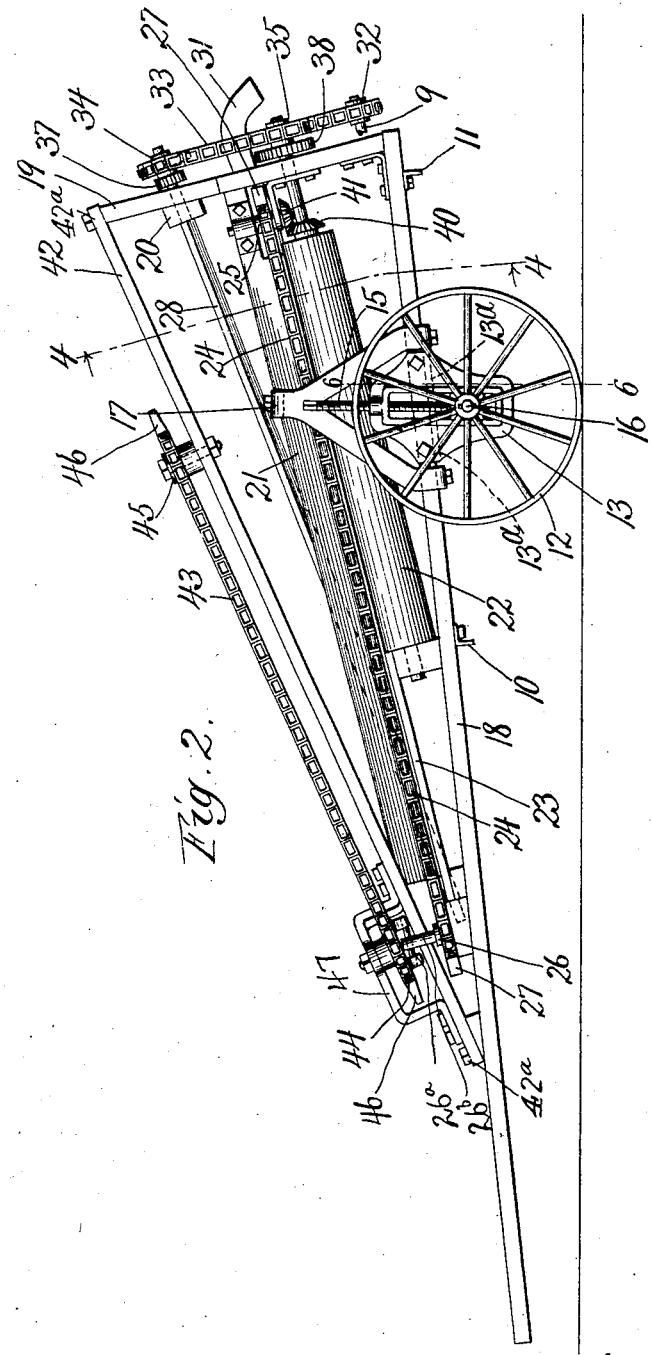

No. 786,286. PATENTED APR. 4, 1905.
E. HAACK.
CORN PICKER AND HUSKER.
APPLICATION FILED APR. 18, 1904.

3 SHEETS—SHEET 3.

Witnesses.
Edward T. Wray.
Fred G. Fischer

Inventor.
Emil Haack
by Burton & Burton
his Attys.

No. 786,286.

Patented April 4, 1905.

UNITED STATES PATENT OFFICE.

EMIL HAACK, OF HOWARD, SOUTH DAKOTA, ASSIGNOR OF ONE-FOURTH TO BOYD WALES, OF HOWARD, SOUTH DAKOTA.

CORN PICKER AND HUSKER.

SPECIFICATION forming part of Letters Patent No. 786,286, dated April 4, 1905.

Application filed April 18, 1904. Serial No. 203,574.

*To all whom it may concern:*

Be it known that I, EMIL HAACK, a citizen of the United States, residing at Howard, in the county of Miner and State of South Dakota, have invented new and useful Improvements in Corn Pickers and Huskers, of which the following is a specification, reference being had to the accompanying drawings, forming a part thereof.

This invention relates to machines for picking corn from the standing stalks in the field and husking same in and by the machine which accomplishes the picking, so that the husked ears may be delivered.

It consists of the features of construction set out in the claims.

Figure 1:
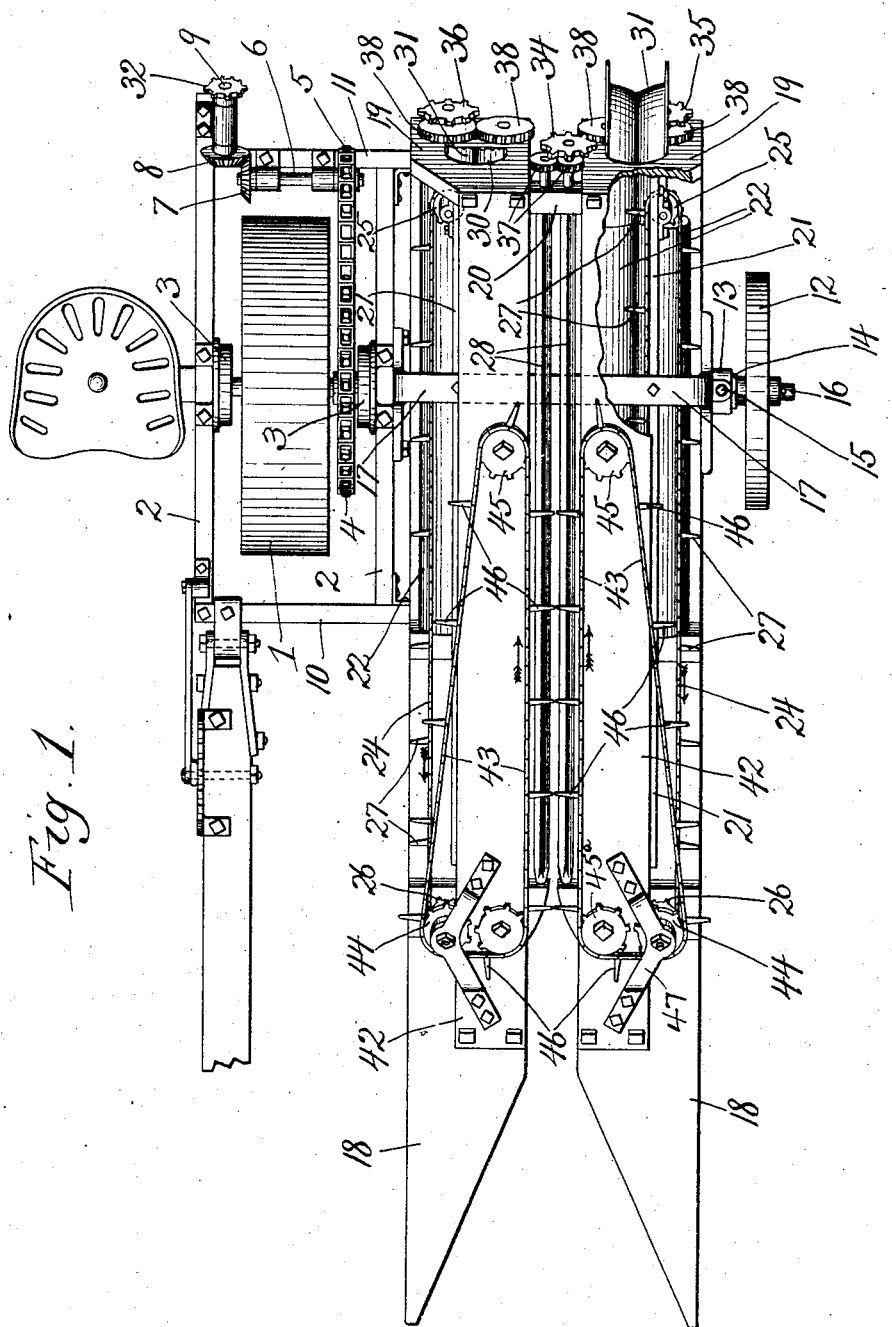
Figure 3:
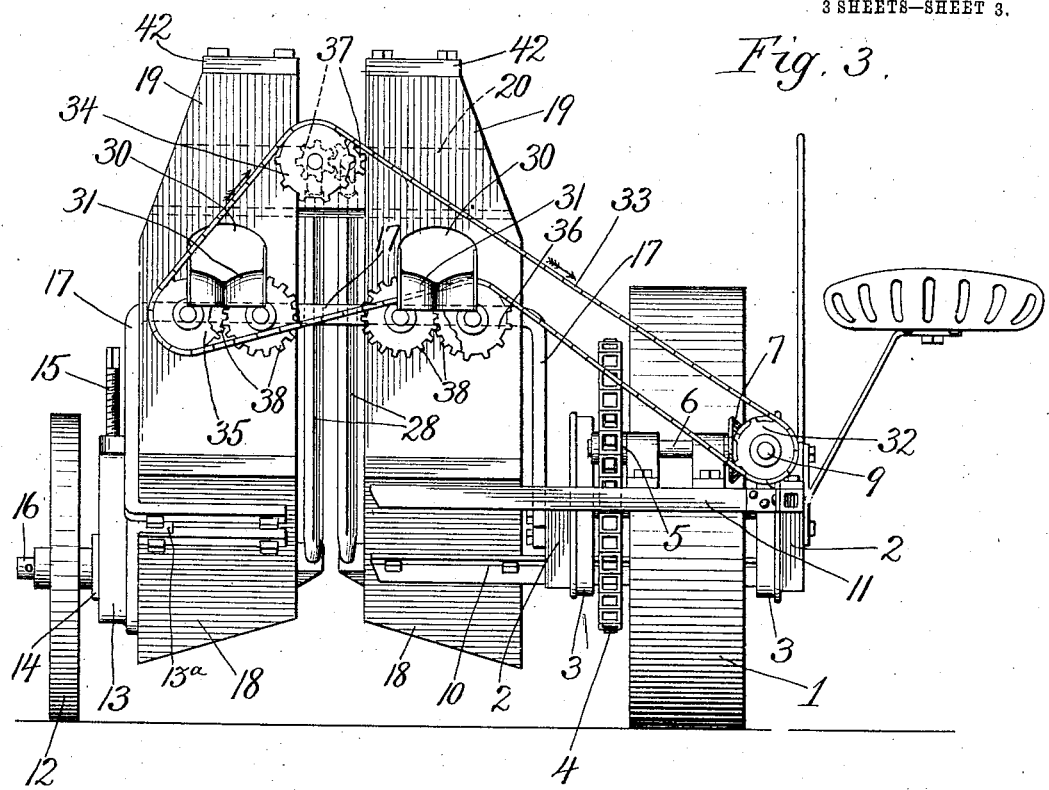
Figure 4:
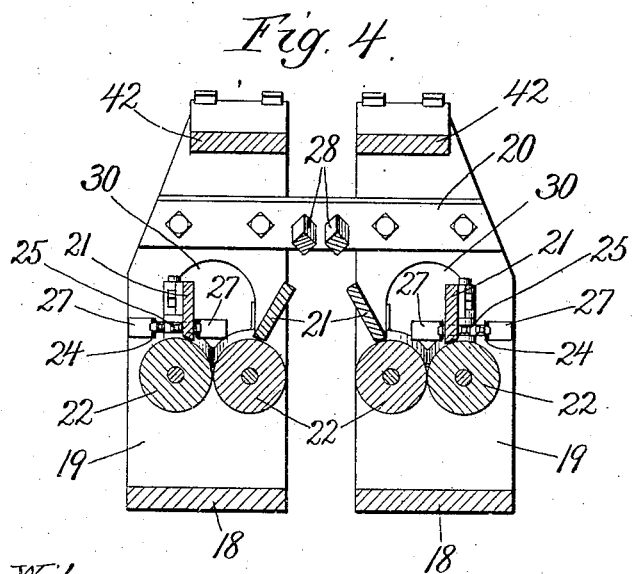
Figure 6:
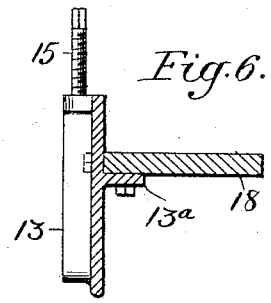

In the drawings, Figure 1 is a plan view of a machine embodying my invention. Fig. 2 is a side elevation of the same. Fig. 3 is a rear elevation of the same. Fig. 4 is a section at the line 4 4 on Fig. 2. Fig. 5 is a detail view of one of the sprocket-wheels. Fig. 6 is a detail section at the line 6 6 on Fig. 2.

This machine comprises a traction-wheel 1, and a main frame 2, in which the traction-wheel is mounted and adapted to be raised and lowered in segments 3 3 in a manner familiar in machines of this class and requiring no particular description. Power is communicated from the traction-wheel through a main sprocket-wheel 4 to a sprocket-wheel 5 on the main power-shaft 6 and thence by intermeshing beveled gears 7 and 8 to a fore-and-aft shaft 9, all the mechanism thus far described being mounted on the main frame in the vicinity of the traction-wheel. Said main frame comprises front and rear sills 10 and 11, extending grainward and affording support, as hereinafter described, to the stubbleward member of the stalk-gatherer hereinafter described. Said stalk-gatherer comprises, in addition, the grainward member, which is mounted on a frame having the bearings for the grain-wheel 12. This frame consists of a bracket 13, in which a block 14 is arranged to be adjusted vertically by means of a screw 15, said block having a stud-axle 16 for the grain-wheel, and said bracket is connected by an arch 17 with the grainward side of the main or traction-wheel frame 2. The two members of the stalk-gatherer, on which are mounted the picking and husking devices, stand under this arch and are secured, respectively, to said bracket 13 and the grainward ends of the fore-and-aft sills 10 and 11, as above stated. The particular mode of securing them is a matter of mechanical detail which may be varied indefinitely; but the particular construction shown will be understood from the further detailed description of the structure of the gatherer and mechanism thereon. Each member of the gatherer comprises a sill 18, extending from front to rear, said sills being constructed so as to diverge at their forward ends for engaging the stalks and having their proximate lateral edges from the rear of such diverging portion separated a sufficient distance for a stalk-path or throat to admit between them a bulk of cornstalks as great as necessary to adapt the appliance to practical operation in the field. At the rear end of each sill an upright 19 is made rigid therewith, and the two uprights of the two members of the gatherer are connected by a cross-bar 20 at a distance of about two feet from the sills 18. Above each sill there is mounted in inclined position, sloping upward from front to rear, a trough for the ears consisting of converging sides 21 21, a pair of picking-rolls 22 22, forming the bottom of the trough over the greater part of its extent, and a board 23, forming the bottom at the remainder of the extent toward the lower end. The sides 21 21 are secured to the rear uprights 19 at their rear ends and to the arch 17. The bottom sill 18 of the grain-side gatherer is made fast on ledges 13ª, formed for the purpose on the bracket 13, and the sill 18 of the stubble-side gatherer is similarly supported on the grainward ends of the sills 10 and 11, which are thus connected by the said sill 18. An ear-conveyer consisting of a toothed chain 24 is propelled around sprocket-wheels 25 and 26 at the upper and lower (rear and forward) ends, respectively, of the trough of each gatherer, one ply of the chain running within the trough and the other outside the same, the ear-carrying fingers 27 projecting from the inner ply across the line of contact of the husking-rolls 22 for the purpose of advancing the ears up along the rolls to the point of delivery at the upper end of the trough, as hereinafter more particularly explained.

28 28 are square shafts journaled at their forward ends, one upon each member of the gatherer, and both journaled at the rear in the cross-bar 20. These picking-shafts are separated a sufficient distance to allow the stalks to pass between them, but are close enough together to prevent the passage between them of the ears, or at least of any ears of any considerable size.

The functions of the machine, which consist in gathering the stalks between the gathering-arms, picking the ears therefrom, stripping the husks from the ears, and delivering the ears, are performed in a manner which may be understood from the foregoing description when it is understood that means are provided, hereinafter described, for rotating the picking-shafts downward at their inner sides, so that their square corners engaging the stalks and driving them downward may cause the ears to be broken off from the stalks and fall into the trough on either side, where any protruding points of the husks are engaged between the husking-rolls, which are provided with means for rotating them downward at their proximate sides to carry the husk-leaves between them, thus stripping them from the ears, which are thereupon conveyed upward along the trough by the fingers of the conveyer-chains and delivered at the upper end of the troughs through the uprights 19 19, which have apertures 30 30 for that purpose, outside of and below which there may be provided chutes 31 31, by which the ears may be conducted to receptacles hung upon or trailed behind the machine. For giving the movement above described to the picking and husking devices power is derived from the sprocket-wheel 32 on the rear end of the shaft 9 by means of a chain 33, extending across the rear of the machine to a sprocket-wheel 34 on the rear end of one of the picker-shafts 28, thence about a sprocket-wheel 35 on the rear end of the shaft of the grainward of the grainward pair of husking-rolls, thence across stubbleward and over the sprocket-wheel 36 at the rear end of the stubbleward of the stubbleward pair of husking-rolls, and thence back around the driving sprocket-wheel 32. The two picker-shafts are connected together by spur-gears 37 37, and in like manner the two rolls of each pair of husking-rolls are connected together by spur-gears 38 38. The ear-conveyer chains 24 derive power by means of intermeshing beveled gears 40 41, the former on the shaft of the husking-roll and the latter rigid with the upper or driving sprocket-wheel 25.

Preferably for gathering stalks which are widely spread and holding them in the best position for the operation of the pickers without danger of breaking the stalks each member of the stalk-gatherer has an upper bar 42, which extends from a point on the lower sill forward of the lower sprocket-wheel 26 to the upper end of the upright 19 at an inclination considerably greater than that of the ear-troughs, these two upper bars being separated by an interval sufficient to allow the stalks and ears to pass between them, so that the ears may encounter the picking-shafts. Upon the upper side of each of the bars 42 there is mounted a stalk carrier or feeder consisting of an endless chain 43, passing around sprocket-wheels 44 and 45$^a$ at the lower end and 45 at the upper end, all mounted on the bar 42, the stalk-carrier having stalk-engaging fingers 46 46, &c., which extend from the inner ply of the chain across the gap between the two upper bars for pushing the stalks up along the same as the machine travels. The rate of travel of the chain along the bars should be somewhat greater than the rate of travel of the machine along the ground, so that the device will have the capacity for straightening up stalks which may be encountered leaning forward. A convenient means of driving these stalk-feeding chains consists in providing their lower sprocket-wheels 44 each with two diametrically opposite pairs of lugs 44$^a$, projecting from the lower face, adapted to be engaged by the cross-pin 26$^a$, with which the axle 26$^b$ of the sprocket-wheel 26 is provided. The bars 42 are secured by a single bolt 42$^a$ at each end, so that upon withdrawing said bolt at the lower end and slightly slackening said bolt at the upper end the bar may be lifted to disengage the lugs 44$^a$ from the cross-pin 26$^a$, and then the entire bar may be swung aside about the upper bolt as a pivot, uncovering the troughs whenever it is necessary to obtain access thereto for any purpose in the operation of the machine or to clear therefrom any matter with which they may become clogged. The stalks as they are engaged between the two members of the gatherer and as they thus pass between the two picker-shafts are bent or bowed over forward by the arch 17 as the machine travels over the ground, so that all the ears are stripped from the stalks at a point sufficiently below the upper end of the husking-rolls to afford adequate opportunity for the operation of these rolls in stripping the husks, while the ears are carried up along the trough from the point at which they are broken off before they reach the discharge end of the trough. In view of the encounter which must occur between the arch and the standing stalks it will be seen that the stalk-feeding devices should cease to engage or operate upon the stalks at the point where the latter thus encounter the arch and are bent forward, since otherwise the stalks would be broken off by the positive action of the stalk-feeding fingers forcing back their upper ends past the arch while the latter obstructs the passage of the lower part.

I claim—

1. In a corn picker and husker in combination with two supporting-wheels and a frame carried thereby, a pair of gatherers for the stalks supported on the frame having a stalk-path or throat between them; stalk-feeding devices mounted on the gatherers respectively and operating from front to rear along the stalk-path or throat between the gatherers; picking or ear-detaching devices comprising coöperating members, one upon each stalk-gatherer at opposite sides of the throat, and two ear-troughs, one upon each gatherer; a pair of husking-rolls forming the bottom of each trough and means operating from front to rear above each pair of rolls for advancing the ears from front to rear along each trough, and means for permitting the discharge of the ears rearward at the rear ends of the trough respectively.

2. In a corn picker and husker in combination with two supporting-wheels and a frame mounted thereon; two gatherers for the stalks having the stalk-path or throat extending fore and aft between them; stalk-feeding devices having stalk-engaging means operating from front to rear across the throat or stalk-path; ear detaching or picking devices comprising two coöperating members, one mounted upon each gatherer at opposite sides of the stalk-path; two ear-receptacles, one for each gatherer, each consisting of a trough and a pair of husking-rolls forming the bottom of the trough, and ear-conveying devices operating above the rolls from front to rear, the frame comprising for its connection across the stalk-path a yoke or neck elevated with respect to the wheel-axles, crossing said path below the picking devices and above the husking devices.

3. In a corn picker and husker, in combination with a traction-wheel and a frame supported thereon, a grain-wheel and a frame supported thereon; a pair of gatherers for the stalks mounted one upon each of said frames and having a stalk-path or throat between them; husking devices on the gatherers respectively extending alongside said stalk-path at opposite sides thereof, and an arch which constitutes the rigid connection between the two frames extending across the stalk-path or throat above the husking devices.

4. In a corn picker and husker, in combination with a traction-wheel, a grain-wheel, frames supported on said wheels respectively; an arch which constitutes the rigid connection between said frames; a pair of stalk-gatherers extending fore and aft at opposite sides of the stalk-path, mounted one upon each of said frames comprising sills extending from front to rear underneath the arch; husking devices mounted on said sills respectively, and picking or ear-detaching devices, one upon each gatherer, extending above the arch.

5. In a corn picker and husker, in combination with a traction-wheel and a frame supported thereon, a grain-wheel and a frame supported thereon, a pair of gatherers for the stalks mounted one upon each of said frames and having a stalk-path or throat between them; picking or ear-detaching devices, one upon each gatherer; husking devices on the gatherers respectively extending alongside said stalk-path at opposite sides thereof, and an arch which constitutes the rigid connection between the two frames extending across the stalk-path or throat above the husking devices and below the picking or ear-detaching devices.

6. In a corn picker and husker, in combination with a traction-wheel, a grain-wheel; frames supported by said wheels respectively; an arch which rigidly connects such frames; a pair of stalk-gatherers supported one upon each frame, with a throat or stalk-path between them extending fore and aft; husking devices mounted upon said gatherers respectively underneath the arch, and stalk-feeding devices mounted on the gatherers respectively above the arch.

7. In a corn picker and husker, in combination with a traction-wheel, a frame supported thereon; a grain-wheel and a frame supported thereon; a stalk-gatherer supported on each frame; stalk-feeding devices; an ear-picking device and husking devices mounted on each gatherer, and an arch connecting the two frames extending across the interval between the two gatherers below the stalk-feeding devices and ear-picking devices and above the husking devices.

8. A corn picker and husker comprising, in combination with traction-wheel, grain-wheel and rigidly-connected frames supported by said wheels respectively, a pair of coöperating gatherers mounted on said frames respectively and extending fore and aft, with a stalk-path between them; two angular bars journaled for rotation at the proximate edges of the gatherers for bounding the stalk-path, and means at the rear ends of said bars for rotating them in opposite directions.

9. A corn picker and husker comprising, in combination with traction-wheel, grain-wheel, and rigidly-connected frames supported on said wheels respectively; a pair of coöperating stalk-gatherers supported on said frames and extending fore and aft above the axes of the wheels, each of said gatherers comprising an ear-trough inclined upward from front to rear, and having a pair of rollers constituting the bottom of the trough; means operating in the trough for conveying the ears upward and rearward along the same above the rollers; means operating at the proximate margins of said troughs for detaching the ears; stalk-feeding devices mounted above the troughs respectively, and means for operating the rolls and the ear and stalk feeding devices from the rear end of the gatherers respectively.

10. In a corn picker and husker, a pair of coöperating stalk-gatherers; means for supporting the same at opposite sides of a path for the stalks left open between them; means at the proximate margins of said gatherers for detaching the ears; a trough in each of the gatherers for receiving the ears; husking means at the bottom of said troughs; an endless conveyer for advancing the ears upward and rearward along the trough comprising each a driving sprocket-wheel at the rear and driven sprocket-wheel at the forward end; a stalk-feeding device mounted on each gatherer above the ear-conveyer comprising each an endless chain and sprocket-wheels around which it is driven, the lower forward sprocket-wheel for each of said chains having an axle or hub adapted to be engaged for driving with the driven sprocket-wheel of the ear-conveyer.

11. In a corn picker and husker, a pair of coöperative stalk-gatherers; means for supporting the same at opposite sides of a path left open for the stalks between them; rotary angular bars at the proximate margins of said gatherers in position for engaging the stalks; means for rotating them with downward movement at their proximate sides for feeding the stalks downward and causing the detachment of the ears above such bars; each gatherer having a receptacle for the ears below the level of said bars; and an arch rigidly connecting the two gatherers extending across the stalk-path between said bars and the ear-receptacles.

In testimony whereof I have hereunto set my hand, in the presence of two witnesses, at Howard, South Dakota, this 28th day of March, 1904.

EMIL HAACK.

Witnesses:
C. A. CRISSEY,
CLIFFORD HOARD.